US009342572B2

(12) United States Patent
Grasselt et al.

(10) Patent No.: US 9,342,572 B2
(45) Date of Patent: *May 17, 2016

(54) WORKFLOW PROCESSING SYSTEM AND METHOD WITH DATABASE SYSTEM SUPPORT (75) Inventors: Mike Grasselt, Leinfelden-Echterdingen (DE); Albert Maier, Tuebingen (DE); Bernhard Mitschang, Boeblingen (DE); Oliver Suhre, Stuttgart (DE); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,308

(22) Filed: May 15, 2012

(65) Prior Publication Data
US 2012/0227055 A1 Sep. 6, 2012

Related U.S. Application Data (63) Continuation of application No. 11/849,742, filed on Sep. 4, 2007, now Pat. No. 8,250,583.

(30) Foreign Application Priority Data

Dec. 4, 2006 (EP) .................................... 06125293

(51) Int. Cl.
G06F 9/455 (2006.01)
G06F 17/30 (2006.01)
(Continued)

(52) U.S. Cl.
CPC ........ *G06F 17/30566* (2013.01); *G06F 9/4881* (2013.01); *G06Q 10/06* (2013.01); *G06F 9/52* (2013.01)

(58) Field of Classification Search
CPC ....... G06F 9/4843; G06F 9/4881; G06F 9/52; G06F 8/45
See application file for complete search history.

(56) References Cited

U.S. PATENT DOCUMENTS 5,890,133 A 3/1999 Ernst
6,009,428 A * 12/1999 Kleewein et al. .......... 707/999.1
(Continued)

FOREIGN PATENT DOCUMENTS

WO 2004114061 A2 12/2004
WO 2005001726 A1 1/2005

OTHER PUBLICATIONS

Haas et al; IBM Federated Database Technology, Mar. 1, 2002.*
(Continued)

*Primary Examiner* — Li B Zhen
*Assistant Examiner* — Bradford Wheaton
(74) *Attorney, Agent, or Firm* — Mollborn Patents, Inc.; Fredrik Mollborn (57) ABSTRACT Methods and apparatus, including computer program products, implementing and using techniques for automatic workflow processing in a workflow processing computer system. A data management system support module receives a data management activity description, determines a set of set references associated with the data management activity, determines a set of data sources associated with the set of set references within a data management system, determines whether the data management system includes infrastructure for accessing the references and for accessing the data sources, in response to determining that the infrastructure is not included, automatically creates the infrastructure from information in a metadata repository coupled to the data management system, replaces in the data management activity description references to set references and references to data sources by references to the infrastructure in the data management system, and delivers the data management activity description for execution by the system.

15 Claims, 4 Drawing Sheets (51) Int. Cl.
   *G06F 9/48*   (2006.01)
   *G06Q 10/06*  (2012.01)
   *G06F 9/52*   (2006.01)

(56) References Cited

U.S. PATENT DOCUMENTS

| | | | |
|---|---|---|---|
| 6,832,201 | B1 | 12/2004 | Leymann et al. |
| 6,938,240 | B2 | 8/2005 | Charisius et al. |
| 7,027,997 | B1 | 4/2006 | Robinson et al. |
| 7,350,188 | B2 | 3/2008 | Schulz |
| 7,386,577 | B2 | 6/2008 | Arning et al. |
| 7,496,887 | B2 | 2/2009 | Grasselt et al. |
| 7,499,906 | B2 * | 3/2009 | Kloppmann et al. ............ 718/1 |
| 7,890,922 | B2 | 2/2011 | Grasselt et al. |
| 8,078,588 | B2 * | 12/2011 | Lakshminath et al. ....... 707/675 |
| 2002/0032692 | A1 | 3/2002 | Suzuki et al. |
| 2002/0078432 | A1 | 6/2002 | Charisius et al. |
| 2003/0004935 | A1 | 1/2003 | Wilmot et al. |
| 2003/0028550 | A1 | 2/2003 | Lee et al. |
| 2003/0074342 | A1 | 4/2003 | Curtis |
| 2003/0200527 | A1 | 10/2003 | Lynn et al. |
| 2004/0003353 | A1 | 1/2004 | Rivera et al. |
| 2004/0078373 | A1 | 4/2004 | Ghoneimy et al. |
| 2004/0083448 | A1 | 4/2004 | Schulz et al. |
| 2004/0172445 | A1 | 9/2004 | Singh et al. |
| 2004/0215662 | A1 | 10/2004 | Rangadass |
| 2005/0021877 | A1 | 1/2005 | Varpela et al. |
| 2005/0209841 | A1 | 9/2005 | Arning et al. |
| 2006/0224564 | A1 * | 10/2006 | Yu et al. ............................ 707/2 |
| 2008/0092108 | A1 | 4/2008 | Corral |
| 2008/0134198 | A1 | 6/2008 | Grasselt et al. |
| 2008/0312959 | A1 * | 12/2008 | Rose et al. ........................ 705/2 |

OTHER PUBLICATIONS

Lurie; The Federation—Database Interoperability (Part 1), Apr. 24, 2003.*

"Oracle Workflow Developer's Guide", Release 2.6.3. Sep. 2003.*

Busse, Susanne et al: "Federated Information Systems: Concepts, Terminology and Architectures." Forschungsberichte Des Fachbereichs Informatik Bericht NR. 99-9, [Online] Apr. 1999, XP002464396. Retrieved from the Internet: URL:http://www.ipvs.uni-stuttgart.de/abteilungen/as/lehre/lehrveranstaltungen/vorlesungen/WS0405/TSDB_termine/dateien/Buss%20et%20al.pdf> [retrieved on Jan. 14, 2008].

Abate et al. "Workflow Performance Evaluation though WPQL", Jul. 2002, ACM, SEKE'02, pp. 489-495.

Jorgensen, D. Havard, "Interaction as a Framework for Flexible Workflow Modelling", Sep. 2001, ACM, Group '01, pp. 32-41.

Brambilla, M., S. Comai, M. Dario, P. Fraternali, and I. Manolescu, "Declarative Specification of Web Applications Exploiting Web Services and Workflows", Proceedings of the 2004 ACM SIGMOD International D Conference on Management of Data, 2004, 2 pp.

Eilam, T., K. Appleby, J. Breh, G. Breiter, H. Daur, SA Fakhouri, G.D.H. Hunt, T. Lu, S.D. Miller, LB. Mummert, JA Pershing, and H. Wagner, "Using a Utility Computing Framework to Develop Utility Systems", D IBM Systems Journal, vol. 43, No. 1, 2004, pp. 97-120.

International Search Report and Written Opinion, Jul. 27, 2006, for International Application No. PCT/EP2006/060293, 12 pp.

Oracle "Oracle Workflow Developer's Guide" Release 2.6.3, Part No. B10284-02, Sep. 2003, pp. 1-622.

Oracle "Oracle Workflow User's Guide" Release 2.6.3, Part No. B10285-02, Sep. 2003, pp. 1-136.

Oracle "Oracle Workflow Administrator's Guide" Release 2.6.3, Part No. B10283-02, Sep. 2003, pp. 1-316.

Andrews. T., F. Curbera. H. Dholakia. V. Goland, J. Klein, F. Leymann. K. Liu. D. Roller. D. Smith. S. Thatte,I. Trickovic. &. S. Weerawarana. "Business Process Execution Language for Web Services", [online], Version 1.1. May 5, 2003, [Retrieved on Feb. 24, 2005], retrieved from the Internet at <URI: http://www.ibm.com/developerworks/library/specification/ws•bpel/>.

Advantys. "Advantys Announces the Release of WorkflowGen 3.0 (formerly eFormGen)". Press Release, [online]. Sep. 23, 2003, retrieved from the Internet at <URL: www.workflowgen.com/home/liblocal/docs/pt/pr_en_name.pdf>.

Advantys. "Workflow Software—Integration", [online], (retrieved on Nov. 17, 2005]. retrieved from the Internet at <URL: http://www.workflowgen.com/workflow/home/workflow_software_p335_EN_Y.htm>.

German Patent Application No. 04100395.5, filed Feb. 4, 2004, entitled "Dynamic Determination of Transaction Boundaries in Workflow Systems", invented by Arning, A., M. Kloppmann, F. Leymann, G. Pfau. D. Roller. A. Schmoz, F. Schwenkreis. &. C. Zetner.

German Patent Application No. 04101174.3. filed Mar. 22, 2004, entitled "Optimization of Process Properties for Workflows with Failing Activities". invented by Pfau. G., A. Arning. C. Zentner, F. Leymann. F. Schwenkreis. M. Kloppmann. D. Roller, & A. Schmitz.

IBM Corporation. "BPELJ: BPEL for Java Technology". [online], Mar. 22, 2004. [Retrieved on Mar. 3, 2005]. retrieved from the Internet at <URI: http://www-128.ibm.com/developerworks/webservice/library/ws-bpelj/>.

Kloppmann, M., D. Konig, F. Leymann, G. Pfau, & D. Roller, "Business Process Choreography in WebSphere: Combining the Power of BPEL and J2EE", IBM Systems Journal, vol. 43, No. 2, 2004, pp. 270-296.

Oasis Open, "Oasis Web Services Business Process Execution Language (WSBPEL) TC", [online], 2005, [Retrieved from on Mar. 3, 2005]. retrieved from the Internet at <URL: http://www.oasis-open.org/committees/tc_home.php?wg_abbrev=wsbpel>.

United States Patent Application No. 10/906,085, filed Feb. 2, 2005, entitled "Dynamic Determination of Transaction Boundaries in Workflow Systems", invented by Arning. A .• M. Kloppmann. F. Leymann. G. Pfau. D. Roller, A. Schmitz, F. Schwenkreis. &. C. Zetner.

"PL/SQL User's Guide and Reference", 10g Release 1 (10.1), Dec. 2003.

Ebbers, Mike, et al., "Image and Workflow Library: MQ Series Workflow Concepts, Installation and Administration", IBM International Technical Support Organization, Apr. 1999. First ed. Poughkeepsie, New York.

Knublauch et al, "Tool-supported process analysis and design for the development of multi-agent systems", LNCS 2585, pp. 186-197, 2003.

Rinderle et al, "Integrating process learning and process evolution—A semantics based approach", LNCS 3649, pp. 252-267, 2005.

U.S. Appl. No. 12/166,398 USPTO Notice of Allowance and Fee(s) Due. Date mailed Oct. 31, 2011.

Haas, Laura, et al: "IBM. Federated Database Technology" Internet Citation, [Online] Mar. 1, 2002, XP002464393. Retrieved from the Internet: URL:http://www.ibm.com/developerworks/db2/library/techarticle/0203haas/0203haas.html > [retrieved on Jan. 14, 2008] p. 1-p. 5, p. 7.

Lurie, Marty: "The Federation—Database Interoperability (Part 1)" Internet Citation, [Online] Apr. 24, 2003, XP002464394. Retrieved from the Internet: URL:http://www.ibm.com/developerworks/db2/library/techarticle/0304lurie/0304lurie.html> [retrieved on Jan. 14, 2008] the whole document.

Borkar, Vinayak, et al: "Query Processing in the AquaLogic Data Services Platform." Proceedings of the 32nd International Conference on Very Large Data Bases, [Online] Sep. 2006, pp. 1037-1048, XP002464395 ISBN: 1-59593-385-9. Retrieved from the Internet: URL:http://www.vldb.orconf/2006/p1037-borkar.pdf> [retrieved on Jan. 14, 2008] p. 1037-p. 1040.

Saracco C M, et al: "Enabling distributed enterprise integration with WebSphere and DB2 Information Integrator." IBM Systems Journal, IBM Corp. Armonk, New York, US, vol. 43, No. 2, 2004, pp. 255-226 XP002390475 ISSN: 0018-8670.

PCT Notification of Transmittal of the International Search Report and the Written Opinion of the International Searching Authority, or the Declaration. International Application No. PCT/EP2007/061538. Date mailed Feb. 11, 2008. 14 pages.

\* cited by examiner

WORKFLOW PROCESSING SYSTEM AND METHOD WITH DATABASE SYSTEM SUPPORT

CROSS-REFERENCE TO RELATED APPLICATIONS

This application is a continuation of U.S. patent application Ser. No. 11/849,742, titled "WORKFLOW PROCESSING SYSTEM AND METHOD WITH FEDERATED DATABASE SYSTEM SUPPORT" and filed on Sep. 4, 2007, which in turn claims priority to European Application No. 06125293.8 filed on Dec. 4, 2006. The content of both applications is incorporated herein by reference.

TECHNICAL FIELD

The invention relates to automatic workflow processing in a workflow processing computer system and a computer system.

BACKGROUND

Workflow systems known in the art allow automatic execution of a sequence of processing activities expressed in a workflow description. A typical pattern that can be found in workflows is to extract business data from a variety of different data sources and to combine that data for further processing in subsequent activities in the workflow.

In such systems, the various data processing activities within a workflow are directed to each particular data source individually containing the data in question, such as a particular relational database system of a specific system vendor. Thus, users of the workflow system design workflows in which portions of the required business data are obtained by writing a plurality of data requests, which are each particularly directed to the appropriate data source, for instance using Standard Query Language (SQL) statements.

Further, the various data portions thus acquired need to be combined to become the desired set of data to be processed in the further execution of the workflow, requiring additional technical effort for programming proprietary code for combining the data. This is an additional burden to the workflow system user, since the code is typically difficult to develop and thus a potential source of errors in data processing. Moreover, combining data from various sources oftentimes is inefficient and resource-consuming.

Furthermore, federated data management systems are known in the art. A federated database system is a type of meta-database management system, which transparently integrates multiple autonomous database systems into a single federated database. Thus, these systems integrate heterogeneous data from various databases and provide a uniform front-end user interface to let data requested from the system appear as being from a single data source.

Using federated database systems with existing workflow systems has proven to require a significant amount of additional technical complexity that has to be handled by the user of a workflow system. In order to address the federated database system from the workflow system, the user would need to understand the federated system, particularly how to integrate additional data sources into the system and how to map concepts from his workflow system to concepts of the federated system. In case of changes of the integration logic of the workflow, the user might need to refer to the federated system and find out which changes need to be applied before being able to return to the workflow system and change the workflow accordingly.

Thus, it would be desirable to have a workflow management system and a method of automatic workflow processing in such a system, and a computer system, data processing program, computer program product, and computer data signal therefore, each of which enables automated execution of a workflow while acquiring data from a number of different data sources in a manner transparent to the user of the workflow system while avoiding the disadvantages of the systems of the state of the art.

SUMMARY

In general, in one aspect, the invention provides methods and apparatus, including computer program products, implementing and using techniques for automatic workflow processing in a workflow processing computer system. A data management activity description is received. A set of set references associated with the data management activity is determined. A set of data sources associated with the set of set references is determined. The set of data sources is provided within a data management system. It is determined whether the data management system includes infrastructure for accessing the set of set references and for accessing the set of data sources. If the infrastructure is not included, the infrastructure is automatically created from information in a metadata repository coupled to the data management system. References in the data management activity description is replaced by references to set references, and references to data sources is replaced by references to the infrastructure in the data management system. The data management activity description is delivered for execution by the system.

The details of one or more embodiments of the invention are set forth in the accompanying drawings and the description below. Other features and advantages of the invention will be apparent from the description and drawings, and from the claims.

BRIEF DESCRIPTION OF DRAWINGS

Like reference symbols in the various drawings indicate like elements

DETAILED DESCRIPTION

Figure 1:
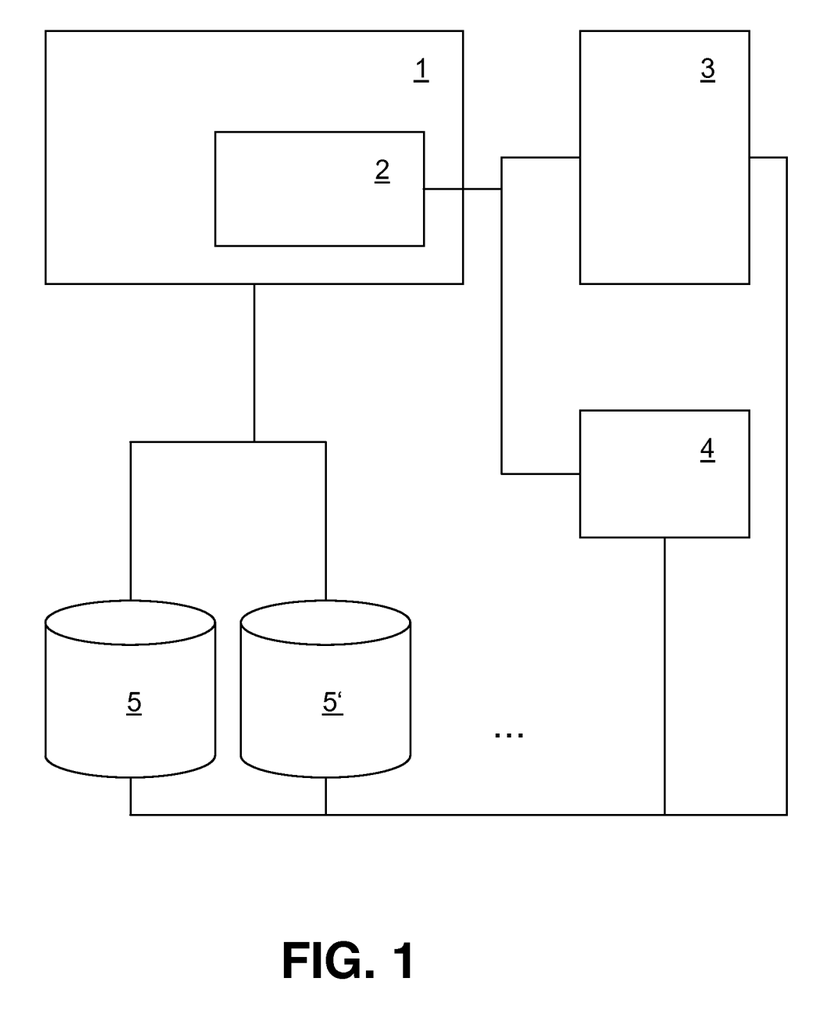
FIG. 1 shows a schematic system overview in accordance with one embodiment of present invention.

FIG. 1 shows a schematic overview of the system in accordance with one embodiment of the present invention. Workflow processing system computer 1 includes a federated data management system support module 2 that is coupled to a federated data management system 3 and to a metadata management system/metadata repository 4.

Further, workflow system 1 is coupled to data sources 5 and 5'. Metadata repository 4 is coupled to databases 5 and 5'. Federated data management system 3 is coupled to databases 5 and 5'. For all embodiments, data sources 5 and 5' represent any number of a variety of different data sources.

Workflow system 1 executes a sequence of processing activities and needs to extract business data from data sources 5, 5' for this purpose. Data sources 5 and 5' are of a different type and contain different sets of business data. Databases 5 and 5' may be from different vendors, each having a different implementation and different access functionalities. Federated data management system 3 has access to data sources 5 and 5' and is able to receive a single request for data and appropriately transform the request to requests to the individual data sources and distribute these requests to the data sources in order to collect the data appropriately.

Federated data management system support module 2 performs the automated interaction between workflow system 1 and federated data management system 3 using metadata information acquired from metadata repository 4. The operation of these components will be further explained with regard to the process shown in the flow diagram of FIG. 2.

Figure 2:
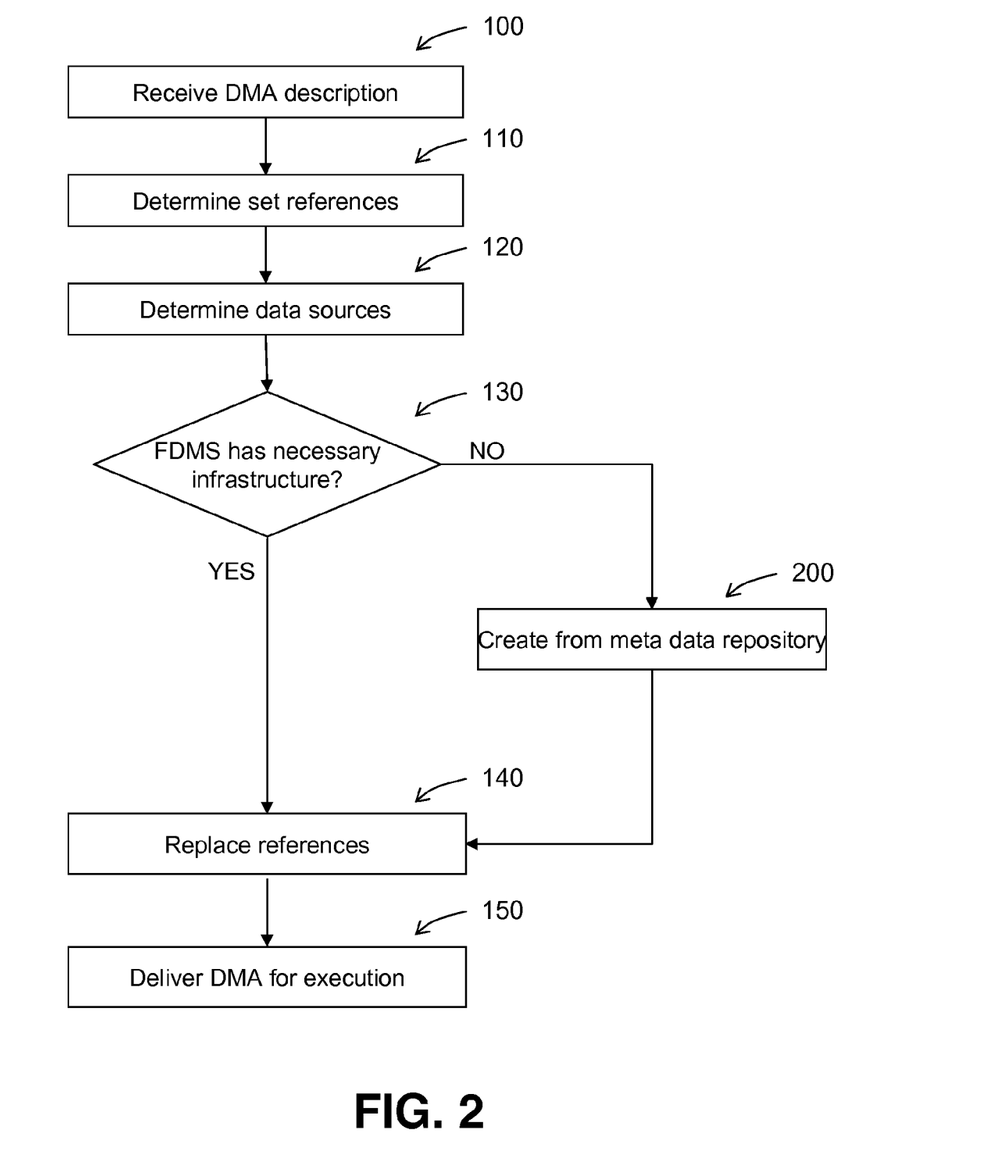
FIG. 2 shows a flow diagram in accordance with one embodiment of present invention.

FIG. 2 shows a flow diagram as an overview of the mode of operation in accordance with one embodiment of the present invention. In step 100, federated data management system support module 2 of the workflow system 1 receives a data management activity (DMA) description containing requests for business data from one or more of databases 5, 5'. Typically, such a DMA description contains multiple requests for data to multiple data sources. Then, the federated data management system support module 2 determines the set of set references that are associated with the input DMA description in step 110. After this, the federated data management system support module 2 determines the set of all data sources associated by the previously determined set of set references and adds the data source which itself is associated with the currently processed data management activity to the set of data sources.

Then, for each member of the set of data sources, the federated data management system support module verifies whether the federated data management system 3 already contains the entire infrastructure necessary to access that individual data source. If the necessary infrastructure is not contained in the federal data management system 3, the federated data management system support module checks whether the information needed to create this infrastructure can be obtained from the metadata repository 4. If the necessary information to create the infrastructure can be derived from the metadata repository, the federated data management system support module 2 creates the infrastructure accordingly and adds the infrastructure to the federated data management system in step 200. In the event that the information necessary for creating the infrastructure can not be derived from the metadata repository 4, the federated data management system support module 2 discontinues operation and returns with an error code informing the user which information is needed to run this activity.

In a similar manner, in step 130 the federated data management system support module 2 further verifies for each member of the set of set references if the federated data management system 3 already contains the necessary infrastructure to access the data from the set each set reference is pointing to. If the necessary infrastructure is not present in the federated data management system 3, the support module 2 checks whether the information needed to create this infrastructure can be obtained from the metadata repository 4, and if so, creates the infrastructure in step 200 and adds it to the federated database system 3 accordingly. Again, if the information necessary to create the infrastructure can not be derived from the metadata repository 4, the federated data management system support module 2 discontinues operation and returns with an error message.

Then, the federated data management system support module 2 modifies the DMA description by replacing references to set references and references to data sources, which originally are directed to each data source individually, by such references that are directed to the infrastructure in the federated data management system 3. Finally, in step 150, the DMA description thus modified is delivered for execution by the workflow system.

Figure 3:
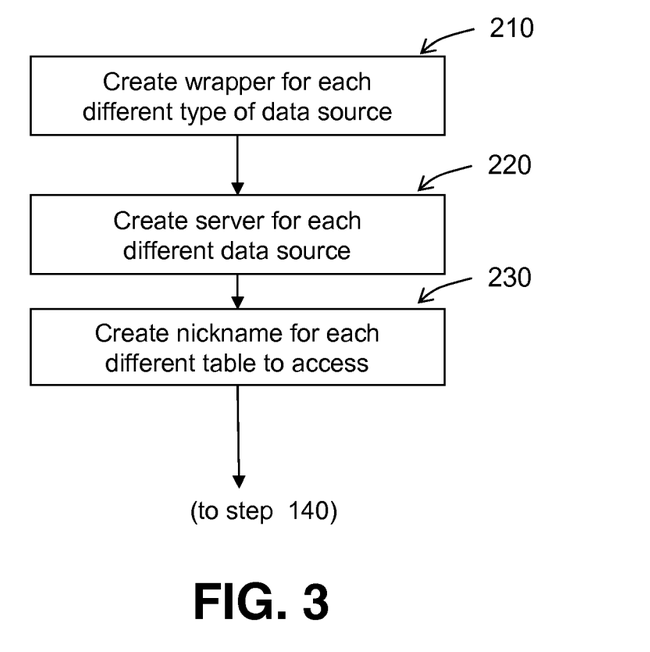
FIG. 3 shows a flow diagram of a detail of the method of FIG. 2, in accordance with one embodiment of present invention.

When determining whether the federal data management system has the necessary infrastructure to access the data sources comprised in the set of data sources, the process detects whether a corresponding wrapper statement exists for each different type of data source, and whether further a corresponding server statement for each different individual data source is present. Accordingly, when checking whether the federated data management system contains a necessary infrastructure to access the data from the set each set reference is pointing to for each member of the set of set references, the federated data management system support module 2 detects whether a corresponding nickname is present for each different set (i.e., table). Thus, as shown in FIG. 3, appropriate creation of lacking statements in the infrastructure of the federated data management system includes creating wrapper statements for each different type of data source in step 210, creating server statements for each different data source in step 220, and creating nickname statements for each different table to access in step 230 where necessary.

Figure 4:
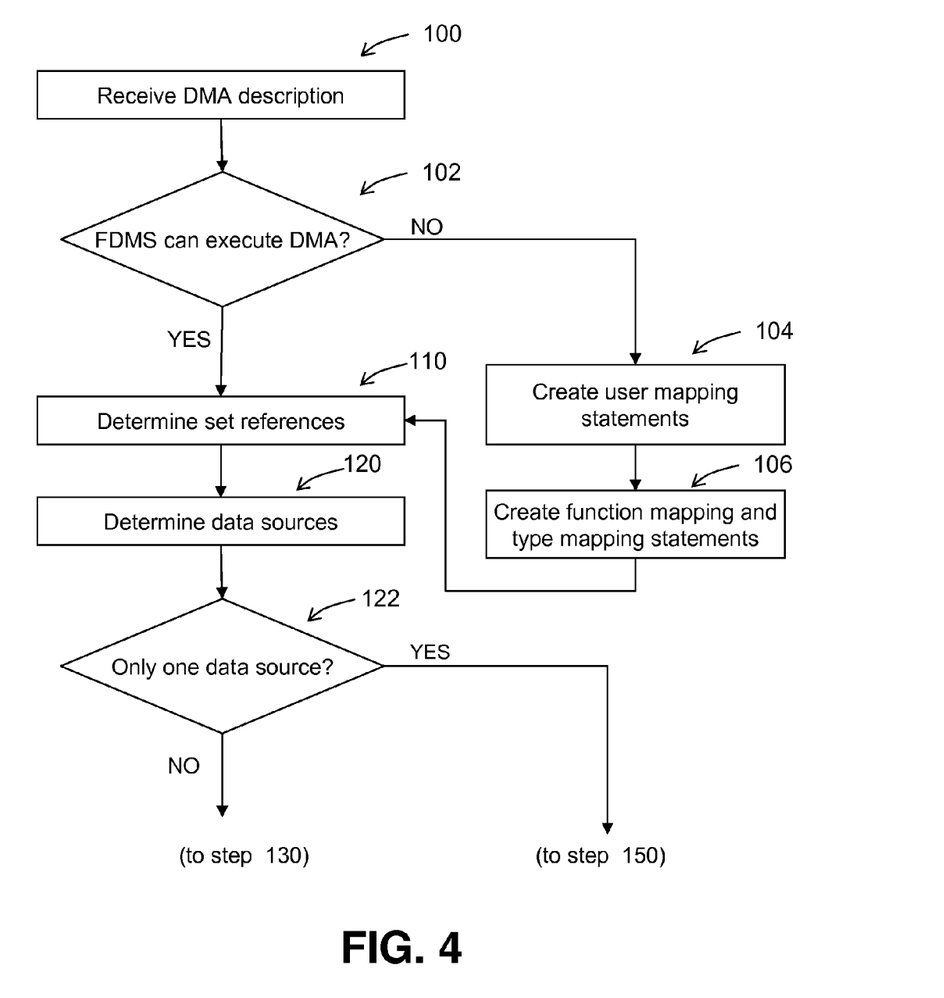
FIG. 4 shows further details of the method of FIG. 2, in accordance with one embodiment of present invention.

FIG. 4 shows two further aspects of an embodiment in more detail:

First, the federated data management system support module 2 checks whether the federated data management system is capable of executing all of the operations defined in the input DMA description. If the federated data management system can not execute all operations of the DMA description with the present infrastructure, it creates additional infrastructure in step 104 and 106. For this, it first checks whether the required information for creating appropriate user mapping artefacts and appropriate function mapping and type mapping artefacts can be obtained from metadata repository 4 and, if so, creates the appropriate statements and returns to the normal process run as specified in various embodiment of the present invention. If the information necessary for creating this additional infrastructure can not be obtained from the metadata repository, operation is discontinued and an error code is generated.

Second, the federated data management system support module 2 not only determines the set of data sources in step 120 but also checks if the number of identified data sources is equal to 1 in step 122. If there is only one element in the set of data sources, it is not necessary to transform the DMA description to address the federated data management system is not necessary, since all data processing operations and data access operations of the DMA description are directed to the same individual data source (5, or 5' alternatively). In this case, the originally received DMA description is returned for execution in step 150, and no further transformation processing is performed.

To give an example for data source access operations in DMA descriptions and statements and infrastructure produced by embodiments of the present invention, consider three activities I1, I2, and I3 specified by a user of the system.

I1 loads a first set of business data from a DB2 database for z/OS:

```
SELECT c.cid, sum(a.balance), age(c.birthday), c.income,
    c.profession
FROM customers c, customer_accounts ca, accounts a
WHERE c.cid = ca.cid and ca.aid = a.aid
GROUP BY c.cid
```

This SQL statement returns a set reference (SR1) to the workflow engine (as opposed to a copy of the data set, thus saving data space and network capacity).

In a similar manner, the SQL statement I2 loads business data from an Oracle database:

```
SELECT i.cid, sum(i.shares)
FROM investments i
GROUP BY i.cid
and thus returns a set reference (SR2) to the workflow engine.
```

Furthermore, SQL statement I3 loads business data from an Excel data source:

```
SELECT r.cid, r.rating
FROM ratings r
thus returning a set reference (SR3) to the workflow engine.
```

Instead of having to write proprietary code (for instance, in the Java™ programming language) to join these three sets and to construct a new set consisting of all tuples that fulfil specific criteria defining the result set, as in the state of the art, the user is enabled, with the system in accordance with one embodiment of the present invention, to write a simple SQL statement to join the three set references and apply filter functions to acquire the desired result set, like the following SQL statement I4 to be executed by the workflow engine (transparently forwarding it to the federated data management system):

```
SELECT s1.cid, s1.balance, s2.shares, s3.rating, s1.age,
    s1.income, s1.profession
FROM sr1 s1, sr2 s2, sr3 s3
WHERE s1.cid = s2.cid and s2.cid = s3.cid and s1.balance >
    10000 and s3.rating > 3
```

It is not only easier for users of the workflow system to formulate activity I4 using SQL statements instead of writing a complex and proprietary program to deliver the same result, it is also typically much more efficient to have SQL statements executed via the federated data management system from a performance point of view, since the federated system optimizes the execution of n-way join operations by optimizing for system internal factors like performance costs of different join algorithms, hardware and software speed, or network topology.

For this example, the infrastructure automatically created by the system in steps 200 to 230 and 104 and 106 is exemplified by the following create statements:

```
create wrapper Net8;
create server oraserver type oracle version 8 wrapper Net8
    authorization "demo" password "cdidemo" options (node'iidemo2');
create user mapping for user SERVER oraserver OPTIONS (
    REMOTE_AUTHID 'demo', REMOTE_PASSWORD 'cdidemo');
create nickname n2 for oraserver.Investments;
```

This creates the necessary infrastructure for the data access as given under I2, that is, the Oracle® data source and the Oracle® table investments. Creation statements are generated in a similar manner for I1 and I3.

In the embodiment shown, data sources are represented in the workflow system as Java™ Naming and Directory Interface (JNDI) names for Java™ Database Connectivity (JDBC) data sources. The metadata repository 4 includes information about the characteristics of the data sources of the present system. Metadata repository 4 further offers a search function that allows specifying at least one characteristic of a database object, such as its JNDI name, and to access the object and its further characteristics.

In the above example, the characteristics thus detected from the metadata repository are that the system is of type "Oracle 8", that it supports the "Net8" protocol, that it can be accessed using its name "iidemo2" when using said protocol, and that, for establishing the connection, user name "demo" and password "cdidemo" can be used. These information are directly included in the respective "create wrapper" and "create server" statements of above example. For generating the "create user mapping" statement, the metadata repository is queried to provide, for the current authorization-ID under which the user accesses the workflow system, the Oracle user-ID and password that allows said user to log in to the Oracle system.

Consequently, statement I4 is modified by the system to direct all data accesses to the federated data management system, using the infrastructure as described above to run the following SQL statement:

```
SELECT n1.cid, n1.balance, n2.shares, n3.rating, n1.age,
    n1.income, n1.profession
FROM n1, n2, n3
WHERE n1.cid = n2.cid and n2.cid = n3.cid and n1.balance >
    10000 and n3.rating > 3
```

In order to obtain the necessary information to build the infrastructure, as described above, the federated data management system support module acquires information about the data sources and the used tables in the SQL statements specified by the user by accessing a metadata management system 4. The metadata management system 4 is capable of storing additional information about the system environment and is able to use different types of specifications for data sources depending on the specific federated system and the specific workflow system. For instance, the workflow engine might use Java Database Connectivity (JDBC) connections and specifications whereas the federated data management system might use ODBC connections and specifications. The metadata management system 4 holds such mapping information and further holds mapping information for different user managements.

Typically, each of the systems includes a particular user management, so that a user having access to a first database 5 in the system is not automatically granted access to a second database 5' in the system. Therefore, many such user mappings may exist, all of which are to be reported to the metadata repository. Alternatively, a common user directory can be implemented for all participating systems, for instance a directory service using the Lightweight Directory Access Protocol (LDAP). Combinations combining both a central and distributed user management are possible. However, the metadata repository always contains information about these configurations.

Another embodiment of the present invention is a combination of the foregoing embodiments with the optimization of workflows in a workflow system as specified in the European Patent Application No. EP05108096.8, entitled "Optimization in Workflow Management Systems," by International Business Machines Corporation. The embodiments described therein relate to optimization of data management activities in workflows. When executing the optimization steps on a workflow having a DMA description for which the transformation steps of the embodiments of the present invention as described above have been performed, the various data request operations, such as I1, I2, and I3 included in a DMA description can be optimized to be directed towards a single data source, namely the federated data management system. This is achieved by adding an optimization pattern in a combined workflow optimizing/workflow processing system with federated database system support: Rewrite statement referring to data source X to statement that refers to the federated system instead. Thus, operations I1, I2, and I3 are rewritten to be directed to the federated system instead of going directly to the Oracle database, DB2 database, or Excel. The necessary infrastructure in the federated system is obtained as described before. The resulting rewritten statements are, in our example, as follows:

```
I1 (Load from DB2 for z/OS)
SELECT c.cid, sum(a.balance), age(c.birthday), c.income,
    c.profession
FROM nick_customers c, nick_customer_accounts ca,
    nick_accounts a
WHERE c.cid = ca.cid and ca.aid = a.aid
GROUP by c.cid
I2 (Load from Oracle)
SELECT i.cid, sum(i.shares)
FROM nick_investments i
GROUP BY i.cid
I3 (Load from Excel)
SELECT r.cid, r.rating
FROM nick_ratings r
```

Each of those SQL statements is executed against the workflow engine and returns a set reference to the workflow engine appropriately. In the FROM clauses of the SQL statements, nicknames are used that have been created in the federated system. Further, the resulting set references are pointing into the federated system and not to the individual data sources.

Such an optimization and rewriting of DMA makes other patterns of optimization in the above referenced patent application "Optimization in Workflow Management Systems" applicable as well. Considering another example below, and assuming that the determination of clusters in I5 is implemented using SQL technology, it is possible to rewrite the activities I1 to I5 into a single one that will be executed significantly more effectively than the original statements I1 to I5. The following portions of DMA descriptions show original statements I1 to I5 and optimized SQL statement O12:

I1 (Load from DB2 for z/OS) is a SQL statement executed against a DB2 for z/OS data source and returns a set reference SR1 to the workflow engine:

```
SELECT c.cid, sum(a.balance), age(c.birthday), c.income,
    c.profession
FROM customers c, customer_accounts ca, accounts a
WHERE c.cid = ca.cid and ca.aid = a.aid
GROUP BY c.cid
```

I2 (Load from Oracle) is a SQL statement executed against an Oracle data source and returns a set reference SR2 to the workflow engine:

```
SELECT i.cid, sum(i.shares)
FROM investments.i
GROUP BY i.cid
```

I3 (Load from Excel) is a SQL statement executed against an Excel data source and returns a set reference SR3 to the workflow engine:

```
SELECT r.cid, r.rating
FROM ratings r
```

I4 (Join) is a SQL statement executed against the workflow engine and returns a set reference SR4 to the workflow engine:

```
SELECT s1.cid, s1.balance, s2.shares, s3.rating, s1.age,
    s1.income, s1.profession
FROM sr1 s1, sr2 s2, sr3 s3
WHERE s1.cid = s2.cid and s2.cid = s3.cid and s1.balance >
    10000 and s3.rating > 3
```

I5 (Clustering) is a SQL statement executed against the workflow engine and returns a set S5 to the workflow engine:

```
SELECT s4.cid, s4.balance, s4.shares, s4.rating,
    idmmx.dm_applyClusModel(c.model,
        idmmx.dm_impApplData(
            rec2xml(1.0,'COLATTVAL','',
            s4.age, s4.income, s4.profession)))
FROM sr4 s4, idmmx.clustermodels c
WHERE c.modelname='customerCluster';
```

O12 (Optimization Group Result) is a SQL statement executed against the workflow engine, returns a set S5 to the workflow engine:

```
SELECT s4.cid, s4.balance, s4.shares, s4.rating,
    idmmx.dm_applyClusModel(c.model, idmmx.dm_impApplData(
        rec2xml(1.0,'COLATTVAL','',s4.age, s4.income, s4.profession)))
FROM(SELECT s1.cid, s1.balance, s2.shares, s3.rating, s1.age,
    s1.income, s1.profession FROM
        (SELECT c.cid, sum(a.balance), age(c.birthday),
        c.income, c.profession
        FROM nick_customers c, nick_customer_accounts ca,
        nick_accounts a WHERE c.cid = ca.cid and ca.aid =
        a.aid GROUP BY c.cid) as s1,
        (SELECT i.cid, sum(i.shares) FROM nick_investments i
        GROUP BY i.cid) as s2,
        (SELECT r.cid, r.rating FROM nick_ratings r) as s3
        WHERE s1.cid = s2.cid and s2.cid = s3.cid and
        s1.balance > 10000 and s3.rating >3) as s4,
    idmmx.clustermodels c
WHERE c.modelname='customerCluster';
```

Embodiments of the invention can include one or more of the following advantages. Workflow activity description means that describe specific nodes in a workflow and that express data management activities such as SQL statements, stored procedures, XQuery expressions, and so on, can be handled. By processing set references, the data does not need to be copied from the data source to the workflow system at runtime, since set references allow the system (and thus the user) to refer to sets (database tables) rather than copy them. Since the set references can be passed between activities instead of the actual sets, performance of the workflow system can be significantly improved. Further, by determining the set references associated with the data management activity and determining the set of data sources associated with the set of set references, the data necessary for detecting if the federated data management system comprises the necessary infrastructure for accessing the set of set references and the set of data sources is collected. Each data source in the set of data sources that is to profit from embodiments of the present invention is serviced by the federated data management system. Thus, it is possible to centrally address the data sources through the federated data management system rather than individually addressing each data source with the respective request for the particular set of data.

Unnecessary data processing steps of creating the necessary infrastructure are avoided if the infrastructure is already present in the system, for instance in the case it has been created in a previous run.

The user of the workflow system does not have to deal with the additional complexity of manually addressing the federated data management system. The workflow system user can use the workflow management system in a straightforward manner and directly formulate data processing logic directed towards the system. The federated data management system support module comprised in the workflow processing system carrying out the method automatically takes care of setting up the necessary infrastructure in the federated system that is needed to run the queries which have been formulated.

A state of the art metadata source can be used to retrieve information about system components and their capabilities and contents for all system components of the whole system landscape.

The original references programmed by the user of the workflow management system in the manner the user is used to are automatically replaced with centralized references to the federated database management system, so that the resulting modified data management activity description can be executed with the federated data management system, the federated data management system taking care of collecting the data from the various data sources.

Various embodiments of the present invention thus allow users to specify separate queries against component databases while writing efficient and easy-to-handle join statements, all of which, for instance, formulated in the standard query language (SQL). Further, users of the workflow system can specify elaborate queries against the workflow system in a direct manner. In both cases, the workflow system in accordance with various embodiments of the present invention takes care of accessing the data over the federated data management system.

Data management statements intrinsic to the data handling system can be used for creating the infrastructure, and the created infrastructure is stored for reuse in future runs, thus improving efficiency of the system.

When creating additional infrastructure, information can be derived from the metadata repository coupled to the system as well. For implementing such an embodiment, the steps of creating a user mapping artefact as well as creating a function mapping artefact and type mapping artefacts can be utilized.

The system can detect if all data access operations are going against the same data source, in which case a federation is not necessary, and thus saves processing time by not utilizing the federated data management system but having the workflow management system directing the data management activity directly to the individual data source.

Combining embodiments of the present invention with the workflow optimization described in the above referenced patent application allows the addition of a pattern specifying that statements against one or more individual data sources are to be rewritten into statements that are directed to the federated data management system instead. Thus, requests to individual data sources are transformed to be directed to the federated data management system, and the system and method in accordance with various embodiments of the present invention further automatically generate the infrastructure necessary for executing the data operations, providing for additional synergic effects.

The invention can take the form of an entirely hardware embodiment, an entirely software embodiment or an embodiment containing both hardware and software elements. In an embodiment, the invention is implemented in software, which includes but is not limited to firmware, resident software, microcode, and so on.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

To avoid unnecessary repetitions, explanations given for one of the various embodiments are intended to refer to the other embodiments as well, where applicable. Reference signs in the claims shall not be construed as limiting the scope. The use of "comprising" in this application does not mean to exclude other elements or steps and the use of "a" or "an" does not exclude a plurality. A single unit or element may fulfil the functions of a plurality of means recited in the claims.

The invention claimed is:

1. A method for automatic workflow processing in a workflow processing computer system, wherein a group of activities is included in the workflow, the group of activities including at least one data management activity, comprising:
   optimizing the group of activities by:
   determining the at least one data management activity;
   determining at least one data level statement for each of the at least one data management activities;
   determining the group of activities;
   determining a process graph model from the group of activities, wherein the process graph model includes each of the at least one data level statements, and wherein the semantics of the process graph model is identical to the semantics of the group of activities;
   determining an optimized process graph model from the process graph model;
   determining an optimized group of activities from the optimized process graph model, whereby the semantics of the optimized group of activities is identical to the semantics of the optimized process group model;
   replacing, in the workflow, the group of activities by the optimized group of activities,
   wherein the process graph model includes a pattern, the optimized pattern is determined from the process graph model by optimizing the pattern, and wherein further the pattern refers to directing a database statement to a particular data source, and the pattern is optimized by transforming the pattern to a corresponding statement being directed to the data management system;
   receiving, by a data management system support module in the workflow processing computer system, a data management activity description;
   determining, by the data management system support module, a set of set references associated with the data management activity;
   determining, by the data management system support module and using the set of set references, a set of data sources associated with the set of set references, the set of data sources being provided within a data management system;
   determining automatically, by the data management system support module using the set of set references and the set of data sources, whether the data management system includes infrastructure for accessing the set of set references and for accessing the set of data sources;
   in response to determining that the infrastructure is not included, automatically creating, by the data management system support module, the infrastructure from information in a metadata repository coupled to the data management system;
   replacing in the data management activity description, by the data management system support module, references to set references and references to data sources by references to the infrastructure in the data management system; and
   delivering, by the data management system support module, the data management activity description for execution by the data management system.

2. The method of claim 1, wherein the infrastructure is created by at least one of the steps of:
   creating a wrapper artefact for each different type of data source in the set of data sources;
   creating a server artefact for each different data source in the set of data sources;
   creating a nickname artefact for each different table to be accessed; and
   wherein the created infrastructure is added to the system.

3. The method of claim 1, further comprising:
   determining whether the data management system supports the operations defined in the data management activity description; and
   in response to determining that the operations are not supported, creating additional infrastructure to support the operations.

4. The method of claim 3, wherein creating additional infrastructure comprises:
   creating a user mapping artefact; and
   creating function mapping artefacts and type mapping artefacts.

5. The method of claim 1, further comprising:
   determining the number of data sources in the set of data sources; and
   in response to determining that there is a single data source, delivering the original data management activity description unmodified for execution.

6. A workflow processing computer system, coupled to a data management system, at least one data store, and a metadata management system, the workflow processing computer system comprising:
   a data management system support module configured to:
   optimize a group of activities included in a workflow, the group of activities including at least one data management activity, by:
   determining the at least one data management activity;
   determining at least one data level statement for each of the at least one data management activities;
   determining the group of activities;
   determining a process graph model from the group of activities, wherein the process graph model includes each of the at least one data level statements, and wherein the semantics of the process graph model is identical to the semantics of the group of activities;
   determining an optimized process graph model from the process graph model;
   determining an optimized group of activities from the optimized process graph model, whereby the semantics of the optimized group of activities is identical to the semantics of the optimized process group model;
   replacing, in the workflow, the group of activities by the optimized group of activities,
   wherein the process graph model includes a pattern, the optimized pattern is determined from the process graph model by optimizing the pattern, and wherein further the pattern refers to directing a database statement to a particular data source, and the pattern is optimized by transforming the pattern to a corresponding statement being directed to the data management system;
   receive a data management activity description;
   determine a set of set references associated with the data management activity;
   determine, using the set of set references, a set of data sources associated with the set of set references, the set of data sources being provided within a data management system;
   determine automatically, using the set of set references and the set of data sources, whether the data management system includes infrastructure for accessing the set of set references and for accessing the set of data sources;

in response to determining that the infrastructure is not included, automatically create the infrastructure from information in a metadata repository coupled to the data management system;

replace in the data management activity description references to set references and references to data sources by references to the infrastructure in the data management system; and deliver the data management activity description for execution by the data management system.

7. The workflow processing computer system of claim 6, wherein the infrastructure is created by at least one of the steps of:

creating a wrapper artefact for each different type of data source in the set of data sources;

creating a server artefact for each different data source in the set of data sources;

creating a nickname artefact for each different table to be accessed; and wherein the created infrastructure is added to the system.

8. The workflow processing computer system of claim 6, wherein the data management system support module further is configured to:

determine whether the data management system supports the operations defined in the data management activity description; and in response to determining that the operations are not supported, create additional infrastructure to support the operations.

9. The workflow processing computer system of claim 8, wherein creating additional infrastructure comprises:

creating a user mapping artefact; and creating function mapping artefacts and type mapping artefacts.

10. The workflow processing computer system of claim 6, wherein the data management system support module further is configured to:

determine the number of data sources in the set of data sources; and in response to determining that there is a single data source, deliver the original data management activity description unmodified for execution.

11. A computer program product for automatic workflow processing in a workflow processing computer system, the computer program product comprising a non-transitory tangible computer useable storage medium including a computer readable program, wherein the computer readable program when executed on a computer causes the computer to:

optimize a group of activities included in a workflow, the group of activities including at least one data management activity, by:

determining the at least one data management activity;

determining at least one data level statement for each of the at least one data management activities;

determining the group of activities;

determining a process graph model from the group of activities, wherein the process graph model includes each of the at least one data level statements, and wherein the semantics of the process graph model is identical to the semantics of the group of activities;

determining an optimized process graph model from the process graph model;

determining an optimized group of activities from the optimized process graph model, whereby the semantics of the optimized group of activities is identical to the semantics of the optimized process group model;

replacing, in the workflow, the group of activities by the optimized group of activities, wherein the process graph model includes a pattern, the optimized pattern is determined from the process graph model by optimizing the pattern, and wherein further the pattern refers to directing a database statement to a particular data source, and the pattern is optimized by transforming the pattern to a corresponding statement being directed to the data management system;

receive, by a data management system support module in the workflow processing computer system, a data management activity description;

determine, by the data management system support module, a set of set references associated with the data management activity;

determine, by the data management system support module and using the set of set references, a set of data sources associated with the set of set references, the set of data sources being provided within a data management system;

determine automatically, by the data management system support module using the set of set references and the set of data sources, whether the data management system includes infrastructure for accessing the set of set references and for accessing the set of data sources;

in response to determining that the infrastructure is not included, automatically create, by the data management system support module, the infrastructure from information in a metadata repository coupled to the data management system;

replace in the data management activity description, by the data management system support module, references to set references and references to data sources by references to the infrastructure in the data management system; and deliver, by the data management system support module, the data management activity description for execution by the data management system.

12. The computer program product of claim 11, wherein the infrastructure is created by at least one of the steps of:

creating a wrapper artefact for each different type of data source in the set of data sources;

creating a server artefact for each different data source in the set of data sources;

creating a nickname artefact for each different table to be accessed; and wherein the created infrastructure is added to the system.

13. The computer program product of claim 11, wherein the computer readable program when executed on a computer further causes the computer to:

determine whether the data management system supports the operations defined in the data management activity description; and in response to determining that the operations are not supported, create additional infrastructure to support the operations.

14. The computer program product of claim 13, wherein creating additional infrastructure comprises:

creating a user mapping artefact; and creating function mapping artefacts and type mapping artefacts.

15. The computer program product of claim 11, wherein the computer readable program when executed on a computer further causes the computer to:

determine the number of data sources in the set of data sources; and in response to determining that there is a single data source, deliver the original data management activity description unmodified for execution.

* * * * *